(12) United States Patent
You et al.

(10) Patent No.: US 11,589,281 B2
(45) Date of Patent: Feb. 21, 2023

(54) METHOD AND APPARATUS FOR DISTINGUISHING BETWEEN DATA FORMATS, AND COMMUNICATION DEVICE

(71) Applicant: GUANGDONG OPPO MOBILE TELECOMMUNICATIONS CORP., LTD., Dongguan (CN)

(72) Inventors: Xin You, Dongguan (CN); Qianxi Lu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 17/218,156

(22) Filed: Mar. 31, 2021

(65) Prior Publication Data

US 2021/0219202 A1 Jul. 15, 2021

Related U.S. Application Data

(63) Continuation of application No. PCT/CN2019/074608, filed on Feb. 2, 2019.

(30) Foreign Application Priority Data

Oct. 26, 2018 (WO) ................ PCT/CN2018/112134

(51) Int. Cl.
*H04W 36/18* (2009.01)
*H04W 76/27* (2018.01)
(Continued)

(52) U.S. Cl.
CPC ......... *H04W 36/18* (2013.01); *H04W 12/033* (2021.01); *H04W 12/0433* (2021.01);
(Continued)

(58) Field of Classification Search
None
See application file for complete search history.

(56) References Cited

U.S. PATENT DOCUMENTS

| 2009/0041247 A1 | 2/2009 | Barany et al. |
| 2010/0115261 A1 | 5/2010 | Annicchiarico et al. |
| (Continued) | | |

FOREIGN PATENT DOCUMENTS

| CN | 104703230 A | 6/2015 |
| CN | 104798320 A | 7/2015 |
| (Continued) | | |

OTHER PUBLICATIONS

WO, International Search Report, PCT/CN2018/112134, dated Jul. 31, 2019, 31 pages.
(Continued)

*Primary Examiner* — Diane L Lo
(74) *Attorney, Agent, or Firm* — Bayes PLLC

(57) ABSTRACT

The embodiments of the present disclosure provide a method and apparatus for distinguishing between data formats, and a communication device. The method includes a terminal receives a downlink data packet, and determines whether the data format of the downlink data packet is a first data format or a second data format, wherein the first data format indicates that the downlink data packet is encrypted using a first key of a source base station and/or compressed using a first header compression format of the source base station, and the second data format indicates that the downlink data packet is encrypted using a second key of a target base station and/or compressed using a second header compression format of the target base station.

6 Claims, 3 Drawing Sheets

Receiving, by a terminal, a downlink data packet, and determining, by the terminal, whether a data format of the downlink data packet is a first data format or a second data format, wherein the first data format indicates that the downlink data packet is encrypted with a first key of a source base station and/or compressed with a first ROHC profile of the source base station, and the second data format indicates that the downlink data packet is encrypted with a second key of a target base station and/or compressed with a second ROHC profile of the target base station — 201

(51) Int. Cl.
  *H04W 12/0433* (2021.01)
  *H04W 12/033* (2021.01)
  *H04W 28/06* (2009.01)
  *H04W 80/02* (2009.01)

(52) U.S. Cl.
  CPC ........... *H04W 28/06* (2013.01); *H04W 76/27* (2018.02); *H04W 80/02* (2013.01)

(56) References Cited

U.S. PATENT DOCUMENTS

| | | | |
|---|---|---|---|
| 2018/0255533 | A1 | 9/2018 | Choi et al. |
| 2020/0008113 | A1* | 1/2020 | Chen ............... H04W 36/18 |
| 2020/0084664 | A1* | 3/2020 | Wu ............... H04L 47/34 |
| 2020/0374961 | A1* | 11/2020 | Ingale ............... H04W 12/0433 |

FOREIGN PATENT DOCUMENTS

| | | |
|---|---|---|
| CN | 105704197 A | 6/2016 |
| CN | 106330763 A | 1/2017 |
| CN | 107404396 A | 11/2017 |
| CN | 107438274 A | 12/2017 |
| CN | 108631954 A | 10/2018 |
| CN | 108632229 A | 10/2018 |
| TW | I430116 B | 3/2014 |
| WO | 2018038804 A1 | 3/2018 |

OTHER PUBLICATIONS

PCT Written Opinion of the International Searching Authority issued in corresponding International Application No. PCT/CN2018/112134, dated Jul. 31, 2019, 7 pages.
WO, International Search Report, PCT/CN2019/074608, dated Jul. 31, 2019, 28 pages.
PCT Written Opinion of the International Searching Authority issued in corresponding International Application No. PCT/CN2019/074608, dated Jul. 31, 2019, 9 pages.
Supplementary European Search Report issued in corresponding European Application No. 19876561.2, dated Oct. 13, 2021, 8 pages.
"Key Change in DC based HO", Agenda Item: 12.3.2, Source: Apple Inc., 3GPP TSG-RAN WG2 Meeting #103bis, R2-1814584, Chengdu, China, Oct. 8-12, 2018, 3 pages.
First Office Action issued in corresponding European Application No. 19876561.2, dated Jun. 17, 2022.
First Office Action issued in corresponding Indian Application No. 202127015694, dated Dec. 8, 2022.

\* cited by examiner

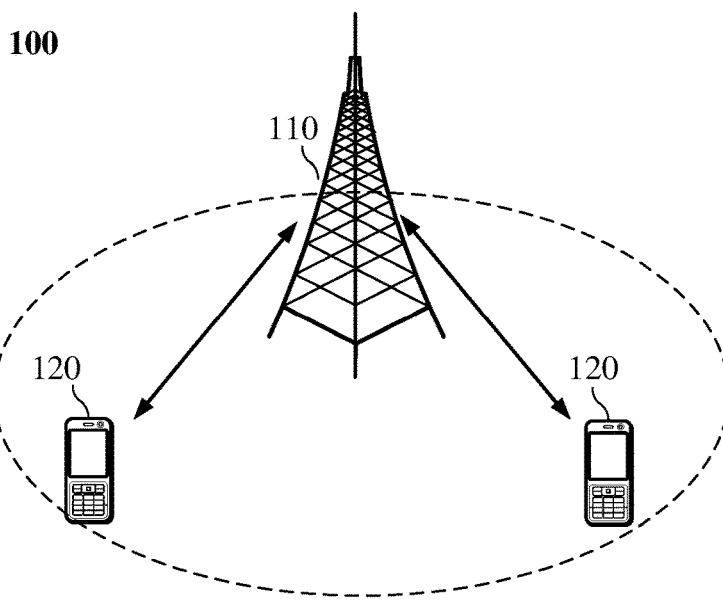

FIG. 1

Receiving, by a terminal, a downlink data packet, and determining, by the terminal, whether a data format of the downlink data packet is a first data format or a second data format, wherein the first data format indicates that the downlink data packet is encrypted with a first key of a source base station and/or compressed with a first ROHC profile of the source base station, and the second data format indicates that the downlink data packet is encrypted with a second key of a target base station and/or compressed with a second ROHC profile of the target base station   201

FIG. 2

Receiving a uplink data packet by a network, and determining by the network whether a data format of the uplink data packet is a first data format or a second data format, wherein the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station   301

FIG. 3

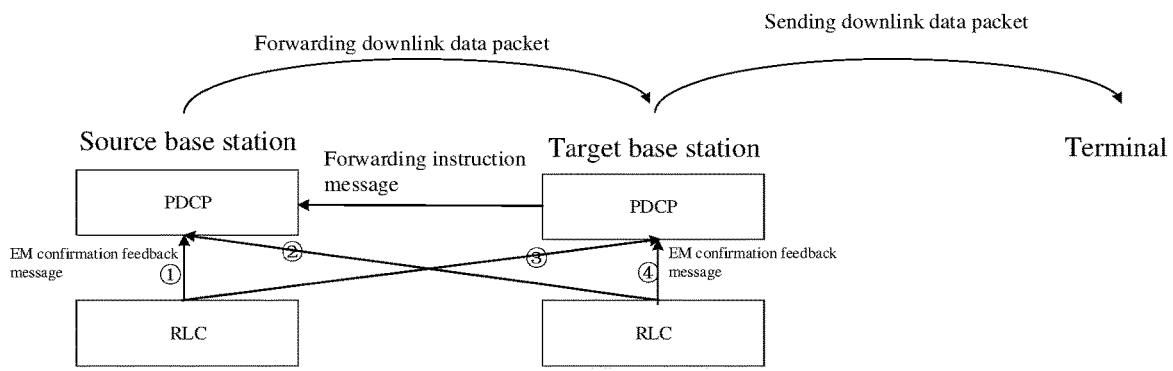

FIG. 4(a)

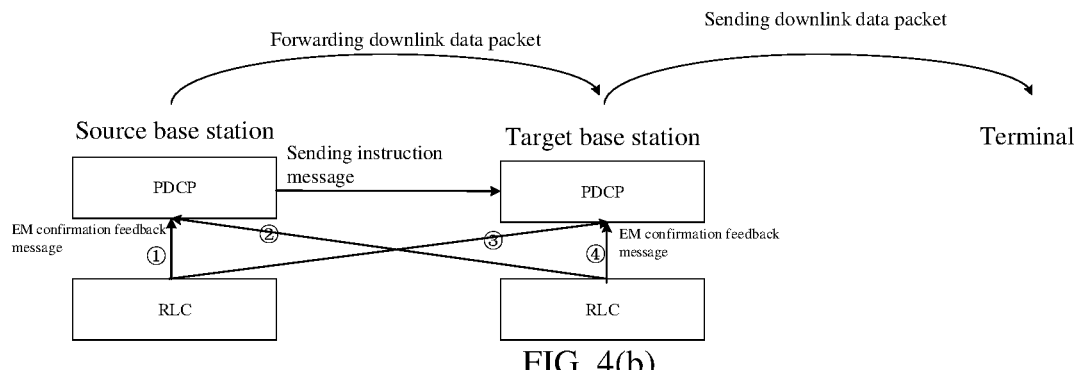

FIG. 4(b)

A terminal sends a uplink data packet, the uplink data packet having a first data format or a second data format, where the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station — 501

The terminal indicates to a network whether the data format of the uplink data packet is the first data format or the second data format — 502

FIG. 5

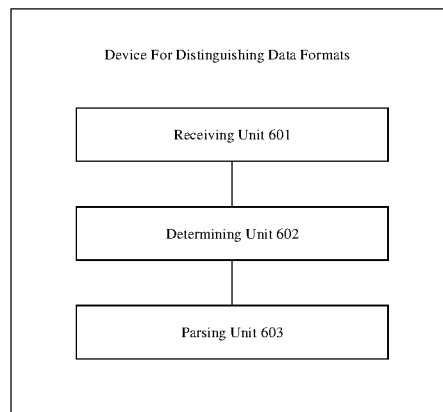

FIG. 6

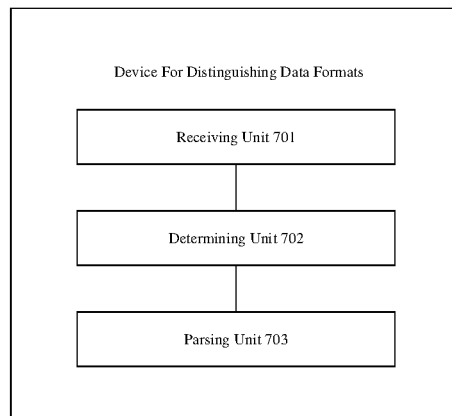

FIG. 7

METHOD AND APPARATUS FOR DISTINGUISHING BETWEEN DATA FORMATS, AND COMMUNICATION DEVICE

CROSS-REFERENCE TO RELATED APPLICATIONS

This application is a continuation application of International Application No. PCT/CN2019/074608, entitled "METHOD AND APPARATUS FOR DISTINGUISHING BETWEEN DATA FORMATS, AND COMMUNICATION DEVICE," filed on Feb. 2, 2019, which claims the benefit of priority to International Patent Application No. PCT/CN2018/112134, entitled "METHOD AND APPARATUS FOR DISTINGUISHING BETWEEN DATA FORMATS, AND COMMUNICATION DEVICE", filed on Oct. 26, 2018, both of which are incorporated herein by reference in their entireties.

BACKGROUND

The embodiments of the present disclosure relate to the field of mobile communication technologies, and in particular to a method and device for distinguishing data formats, and a communication device.

Mobility enhancement for reducing handover delay mainly includes two methods, one is handover based on Dual Connectivity (DC), and the other is handover based on enhanced Mobile Broadband (eMBB). The DC-based handover achieves the effect of handover mainly by adding a target base station as a Secondary Node (SN) and then changing the SN to a Master Node (MN) through role change. The eMBB-based handover refers to maintaining a connection with a source base station while connecting to the target base station, so as to achieve uninterrupted handover.

There is only one Packet Data Convergence Protocol (PDCP) entity on the terminal side (and also on the network side), which means that the PDCP entity needs to support keys and/or ROHC profiles of both the source base station and the target base station.

SUMMARY

The embodiments of the present disclosure provide a method and device for distinguishing data formats, and a communication device.

A method for distinguishing data formats according to the embodiments of the present disclosure includes: receiving a downlink data packet by a terminal, and determining by the terminal whether a data format of the downlink data packet is a first data format or a second data format, where the first data format indicates that the downlink data packet is encrypted with a first key of a source base station and/or compressed with a first ROHC profile of the source base station, and the second data format indicates that the downlink data packet is encrypted with a second key of a target base station and/or compressed with a second ROHC profile of the target base station.

A method for distinguishing data formats according to the embodiments of the present disclosure includes: receiving a uplink data packet by a network, and determining by the network whether a data format of the uplink data packet is a first data format or a second data format, where the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station.

A communication device according to the embodiments of the present disclosure includes a processor and a memory. The memory is used to store a computer program, and the processor is used to call and run the computer program stored in the memory to perform the above-mentioned method for distinguishing data formats.

A chip according to the embodiments of the present disclosure is used to implement the above-mentioned method for distinguishing data formats.

Specifically, the chip includes a processor, configured to call and run a computer program from a memory, to cause a device installed with the chip to perform the above-mentioned method for distinguishing data formats.

A computer-readable storage medium according to the embodiments of the present disclosure is used to store a computer program which causes a computer to perform the above-mentioned method for distinguishing data formats.

A computer program product according to the embodiments of the present disclosure includes computer program instructions, which cause a computer to perform the above-mentioned method for distinguishing data formats.

A computer program according to the embodiments of the present disclosure, when running on a computer, causes the computer to perform the above-mentioned method for distinguishing data formats.

BRIEF DESCRIPTION OF THE DRAWINGS

The drawings described herein are used to provide a further understanding of the present disclosure and constitute a part of the present disclosure. The exemplary embodiments and descriptions of the present disclosure are used to explain the present disclosure, and do not constitute an improper limitation of the present disclosure.

FIG. 1 is a schematic diagram of a communication system architecture according to an embodiment of the present disclosure.

FIG. 2 is a first flowchart of a method for distinguishing data formats according to an embodiment of the present disclosure.

FIG. 3 is a second flowchart of a method for distinguishing data formats according to an embodiment of the present disclosure.

FIG. 4(a) is a first schematic diagram of data forwarding according to an embodiment of the present disclosure.

FIG. 4(b) is a second schematic diagram of data forwarding according to an embodiment of the present disclosure.

FIG. 5 is a third flowchart of a method for distinguishing data formats according to an embodiment of the present disclosure.

FIG. 6 is a first structural diagram of a device for distinguishing data formats according to an embodiment of the present disclosure.

FIG. 7 is a second structural diagram of a device for distinguishing data formats according to an embodiment of the present disclosure.

DETAILED DESCRIPTION

Figure 8:
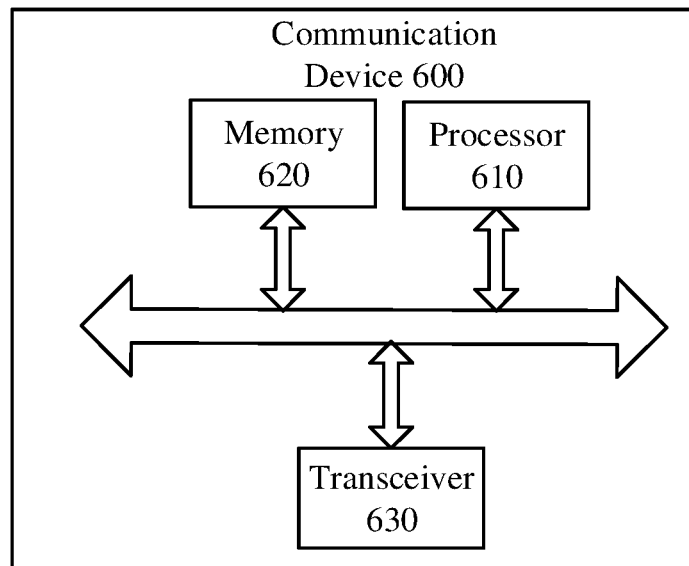
FIG. 8 is a schematic structural diagram of a communication device according to an embodiment of the present disclosure.

The technical solutions in the embodiments of the present disclosure will be described below in conjunction with the drawings in the embodiments of the present disclosure. Obviously, the described embodiments are part of the embodiments of the present disclosure, but not all the embodiments. Based on the embodiments in the present disclosure, all other embodiments obtained by those of ordinary skill in the art without creative work fall within the protection scope of the present disclosure.

The technical solutions of the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunication System (UMTS), a Worldwide Interoperability for Microwave Access (WiMAX) communication system, a 5G system, etc.

For example, a communication system to which the embodiments of the present disclosure are applied is as shown in FIG. 1. The communication system 100 may include a network device 110 which may be a device that communicates with a terminal 120 (or referred to as a communication terminal or a terminal). The network device 110 can provide communication coverage for a specific geographic area and can communicate with terminals located in the coverage area. Optionally, the network device 110 can be a Base Transceiver Station (BTS) in a GSM system or a CDMA system, a NodeB (NB) in a WCDMA system, an Evolutional Node B (eNB or eNodeB) in an LTE system, or a wireless controller in a Cloud Radio Access Network (CRAN). Alternatively, the network device can be a mobile switching center, a relay station, an access point, an on-board device, a wearable device, a hub, a switch, a bridge, a router, a network side device in 5G network, a network device in future evolutional Public Land Mobile Network (PLMN), or the like.

The communication system 100 also includes at least one terminal 120 located within the coverage range of the network device 110. As used herein, the terminal includes, but is not limited to, a device configured to receive/send communication signals and/or an Internet of Things (IoT) device, which may be connected with another device via wired lines, such as Public Switched Telephone Networks (PSTN), Digital Subscriber Line (DSL), digital cables, and direct cable connections; and/or via another data connection/network; and/or via a wireless interface, such as cellular networks, wireless local area networks (WLAN), digital TV networks such as DVB-H networks, satellite networks, AM-FM broadcast transmitter. A terminal configured to communicate through a wireless interface may be referred to as a "wireless communication terminal", a "wireless terminal" or a "mobile terminal". Examples of the mobile terminal include but are not limited to satellite or cellular phones; Personal Communications System (PCS) terminals that can combine cellular radio phones with data processing, fax, and data communication capabilities; PDAs that may include radio phones, pagers, Internet/intranet access, Web browser, memo pad, calendar, and/or Global Positioning System (GPS) receiver; and conventional laptop and/or palmtop receivers or other electronic devices including radio telephone transceivers. The terminal device may refer to access terminals, user equipment (UE), user units, user stations, mobile stations, mobile sites, remote stations, remote terminals, mobile equipment, user terminals, terminals, wireless communication equipment, user agents, or user device. The access terminal may be a cellular phone, a cordless phone, a Session Initiation Protocol (SIP) phone, a wireless local loop (WLL) station, a personal digital assistant (PDA), and wireless communication functional handheld devices, computing devices or other processing devices connected to wireless modems, in-vehicle devices, wearable devices, terminals in 5G networks, terminals in the future evolution of PLMN, or the like.

Optionally, Device to Device (D2D) communication may be performed between the terminals 120.

Optionally, the 5G system or 5G network may also be referred to as a New Radio (NR) system or NR network.

FIG. 1 exemplarily shows one network device and two terminals. Optionally, the communication system 100 may include multiple network devices and other number of terminals can be included in the coverage of each network device, which is not particularly limited in the embodiments of the present disclosure.

Optionally, the communication system 100 may also include other network entities such as a network controller and a mobility management entity, which are not limited in the embodiments of the present disclosure.

It should be understood that the device with a communication function in the network and/or system of the embodiments of the present disclosure may be referred to as the communication device. Taking the communication system 100 shown in FIG. 1 as an example, the communication device may include a network device 110 and terminals 120 which have the communication function. The network device 110 and the terminals 120 may be the specific devices as described above, which will not be repeated here. The communication device may also include other devices in the communication system 100, such as a network controller, a mobility management entity, and other network entities, which are not limited in the embodiments of the present disclosure.

It should be understood that the terms "system" and "network" are often used interchangeably herein. The term "and/or" used herein is merely to describe relative relationships of relative objects, indicating that there can be three kinds of relationships. For example, A and/or B can indicate three cases where A exists alone, A and B exist simultaneously, or B exists alone. In addition, the character "/" used herein generally indicates that the related objects before and after this character are in an "or" relationship.

FIG. 2 is a first schematic flowchart of a method for distinguishing data formats according to an embodiment of the present disclosure. As shown in FIG. 2, the method for distinguishing data formats includes the following steps.

In step 201, a terminal receives a downlink data packet, and determines whether a data format of the downlink data packet is a first data format or a second data format, where the first data format indicates that the downlink data packet is encrypted with a first key of a source base station and/or compressed with a first ROHC profile of the source base station, and the second data format indicates that the downlink data packet is encrypted with a second key of a target base station and/or compressed with a second ROHC profile of the target base station.

In the embodiments of the present disclosure, the terminal may be any device capable of communicating with the network, such as a mobile phone, a tablet, a notebook, a vehicle-mounted terminal, and the like.

In the embodiments of the present disclosure, the source base station refers to a source base station in the handover process, and the target base station refers to a target base station in the handover process. The source base station and the target base station may be of the same type or different types. For example, the source base station is an LTE base station (i.e., eNB), and the target base station is an NR base station (i.e., gNB). For another example, the source base station and the target base station are both LTE base stations (i.e., eNBs) or both NR base stations (i.e., gNBs).

In an embodiment of the present disclosure, the handover process is implemented based on the DC architecture. On this basis, during the handover process, the source base station and the target base station may communicate with the terminal simultaneously, where the source base station side has its own first key and/or first ROHC profile, the target base station side has its own second key and/or second ROHC profile, the first key and/or first ROHC profile of the source base station is used for the data packets transmitted between the terminal and the source base station, and the second key and/or the second ROHC profile of the target base station is used for the data packets transmitted between the terminal and the target base station.

In an embodiment of the present disclosure, after receiving the downlink data packet, the terminal needs to determine whether the data format of the downlink data packet is the first data format or the second data format, where the first data format indicates that the downlink data packet is encrypted with the first key of the source base station and/or compressed with the first ROHC profile of the source base station, and the second data format indicates that the downlink data packet is encrypted with the second key of the target base station and/or compressed with the second ROHC profile of the target base station. Further, if the downlink data packet is in the first data format, the terminal uses the first key to decrypt the downlink data packet and/or uses the first ROHC profile to decompress the downlink data packet, and if the downlink data packet is in the second data format, the terminal uses the second key to decrypt the downlink data packet and/or uses the second ROHC profile to decompress the downlink data packet.

For example, base station 1 is the source base station, and base station 2 is the target base station, where base station 1 uses a key, K1, and uses a ROHC profile, ROHC profile1, and base station 2 uses a key, K2, and uses a ROHC profile, ROHC profile2. The terminal needs to support both {K1, ROHC profile1} and {K2, ROHC profile2}, the data packets transmitted between the terminal and base station 1 are encrypted/decrypted with K1, and are compressed/decompressed with ROHC profile1, and the data packets transmitted between the terminal and base station 2 are encrypted/decrypted with K2, and are compressed/decompressed with ROHC profile2. It should be noted that a sending side of the data packets performs encryption and compression operations, and a receiving side of the data packets performs decryption and decompression operations.

In an embodiment of the present disclosure, the terminal may determine whether the data format of the downlink data packet is the first data format or the second data format in the following manners.

Manner 1: The terminal determines whether the data format of the downlink data packet is the first data format or the second data format through first indication information.

The following describes how to distinguish between the first data format and the second data format in combination with different implementations of the first indication information.

1) The first indication information is carried in a handover command, and the handover command is sent by the source base station to the terminal.

Further, the first indication information includes at least a first serial number of the PDCP layer.

Specifically, if a serial number of the downlink data packet received by the terminal is less than the first serial number, the terminal determines that the data format of the downlink data packet is the first data format, and if the serial number of the downlink data packet received by the terminal is greater than the first serial number, the terminal determines that the data format of the downlink data packet is the second data format.

For example, the handover command sent from the network side to the terminal carries SN=x, then: the downlink data packet with SN<x has the first data format, that is, the downlink data packet with SN<x is encrypted by the source base station with the first key and/or compressed with the first ROHC profile; the downlink data packet with SN>x has the second data format, that is, the downlink data packet with SN>x is encrypted by the target base station with the second key and/or compressed with the second ROHC profile; the downlink data packet with SN=x has the first data format or the second data format, that is, the downlink data with SN=x can be encrypted by the source base station with the first key and/or compressed with the first ROHC profile, or the downlink data with SN=x can be encrypted by the target base station with the second key and/or compressed with the second ROHC profile.

In an embodiment of the present disclosure, the downlink data packet before the first serial number is encrypted by the source base station with the first key and/or compressed with the first ROHC profile, and then is sent to the terminal; or the downlink data packet before the first serial number is encrypted by the source base station with the first key and/or compressed with the first ROHC profile, then is forwarded to the target base station, and is sent to the terminal by the target base station.

In an embodiment of the present disclosure, the downlink data packet after the first serial number is encrypted by the target base station with the second key and/or compressed with the second ROHC profile, and then is sent to the terminal, or the downlink data packet after the first serial number is encrypted by the target base station with the second key and/or compressed with the second ROHC profile, then is forwarded to the source base station, and is sent to the terminal by the source base station.

2) The first indication information is carried in a header of the downlink data packet, and the first indication information is carried in the header of the downlink data packet by the network side.

In an embodiment, the first indication information includes at least first bit information, and a value of the first bit information indicates whether the data format of the downlink data packet is the first data format or the second data format.

For example, the source base station carries 1-bit information in the header of each downlink data packet sent to the terminal, when the value of the 1-bit information is 1, it represents that the downlink data packet has the first data format, that is, the downlink data packet is encrypted with the first key and/or compressed with the first ROHC profile, and when the value of the 1-bit information is 0, it represents that the downlink data packet has the second data format, that is, the downlink data packet is encrypted with the second key and/or compressed with the second ROHC profile.

In an embodiment of the present disclosure, the terminal determines an activated state or a deactivated state of the first indication information based on a first condition.

Specifically, when the terminal receives first RRC signaling, it activates the first indication information, where the first RRC signaling is used to instruct activation of the first indication information, or when the terminal receives a handover command, it activates the first indication information.

Specifically, when the terminal receives second RRC signaling, it deactivates the first indication information, where the second RRC signaling is used to instruct deactivation of the first indication information; or when the handover is completed (that is, when the RRC reconfiguration is completed or the path switch is completed), the terminal deactivates the first indication information.

3) The first indication information is carried in third RRC signaling, and the third RRC signaling is sent by the source base station to the terminal after the source base station sends the last downlink data packet to the terminal.

For example, after the source base station sends the last downlink data packet to the terminal, it sends the first indication information to the terminal through the RRC signaling to instruct the terminal to switch the first key to the second key, and/or switch the first ROHC profile to the second ROHC profile.

Manner 2: The terminal determines whether the data format of the downlink data packet is the first data format or the second data format through a radio link control (RLC) entity corresponding to the downlink data packet.

Here, since the downlink data packet of the source base station is borne by a first RLC entity of the terminal and the downlink data packet of the target base station is borne by a second RLC entity of the terminal, if the downlink data packet received by the terminal is borne by the first RLC entity of the terminal, the terminal determines that the data format of the downlink data packet is the first data format, and if the downlink data packet received by the terminal is borne by the second RLC entity of the terminal, the terminal determines that the data format of the downlink data packet is the second data format.

Manner 3: The terminal uses the first key and the second key to decrypt the downlink data packet, and/or uses the first ROHC profile and the second ROHC profile to compress the downlink data packet, and determines whether the data format of the downlink data packet is the first data format or the second data format based on the decryption result and/or the decompression result.

The terminal using the first key and the second key to decrypt the downlink data packet includes that: the terminal first uses the first key to decrypt the downlink data packet, and then uses the second key to decrypt the downlink data packet; the terminal first uses the second key to decrypt the downlink data packet, and then uses the first key to decrypt the downlink data packet; or the terminal first uses the key with which the last downlink data packet has been successfully decrypted to decrypt the downlink data packet, and then uses the key with which the last downlink data packet is not successfully decrypted to decrypt the downlink data packet.

For example, base station 1 is the source base station, and base station 2 is the target base station, where base station 1 uses a key, K1, and uses a ROHC profile, ROHC profile1, and base station 2 uses a key, K2, and uses a ROHC profile, ROHC profile2. When receiving the data packet n, the terminal first uses {K1, ROHC profile1} to perform the decryption and decompression, and if it fails, it uses {K2, ROHC profile2} to perform the decryption and decompression. Alternatively, it first uses {K2, ROHC profile2} to perform the decryption and decompression, and if it fails, it uses {K1, ROHC profile1} to perform the decryption and decompression. Alternatively, it first uses the key and ROHC profile with which the data packet n−1 is successfully decrypted and decompressed to perform the decryption and decompression, and if it fails, it uses the other key and ROHC profile to perform the decryption and decompression.

Manner 4: The terminal determines whether the data format of the downlink data packet is the first data format or the second data format through a first End Marker (EM).

The first EM indicates a last downlink data packet that is encrypted with the first key and/or compressed with the first ROHC profile. Further, the first EM carries a serial number of the downlink data packet.

1) When receiving second indication information, the source base station forwards the downlink data packet to the target base station, and when receiving the downlink data packet forwarded by the source base station, the target base station sends the downlink data packet to the terminal.

Specifically, after the source base station receives a EM confirmation feedback message sent by the terminal, it forwards the downlink data packet to the target base station, or after the source base station receives a forwarding instruction message sent by the target base station, it forwards the downlink data packet to the target base station, where the forwarding instruction message is sent by the target base station to the source base station after the target base station receives the EM confirmation feedback message sent by the terminal, and the EM confirmation feedback message is used for indicating that the first EM is correctly received by the terminal.

In the above solution, the EM confirmation feedback message received by the source base station is borne on a non-split bearer on the source base station side or a split bearer on the source base station side. The EM confirmation feedback message received by the target base station is borne on the non-split bearer on the target base station side or the split bearer on the target base station side.

For example, refer to FIG. 4(a), which is a first schematic diagram of data forwarding according to an embodiment of the present disclosure. After the source base station receives the EM confirmation feedback message through ① or ②, it forwards the downlink data packet to the target base station, or after the target base station receives the EM confirmation feedback message through ③ or ④, it instructs the source base station to forward the downlink data packet through a forwarding instruction message. After the target base station receives the downlink data packet forwarded by the source base station, it directly sends it to the terminal. The EM confirmation feedback messages for ① and ④ are borne on the non-split bearer, and the EM confirmation feedback messages for ② and ③ are borne on the split bearer.

Not limited thereto, the source base station may also forward the downlink data packet to the target base station after receiving a handover request confirmation feedback message.

In the above solution, when the target base station sends the downlink data packet to the terminal, it uses the second key to encrypt the downlink data packet and/or uses the second ROHC profile to compress the downlink data packet, and sends the downlink data packet having the second data format to the terminal.

In the above solution, the downlink data packet forwarded by the source base station to the target base station includes: a downlink data packet that is not sent by the source base station to the terminal and/or a downlink data packet that is sent by the source base station to the terminal but is not correctly received by the terminal.

2) The source base station forwards the downlink data packet to the target base station, and after the target base station receives the downlink data packet forwarded by the source base station, it caches the downlink data packet and does not send the downlink data packet to the terminal until the second indication information is received.

Specifically, after receiving the EM confirmation feedback message sent by the terminal, the target base station sends the downlink data packet to the terminal. Alternatively, after the target base station receives a sending instruction message sent by the source base station, it sends the downlink data packet to the terminal, where the sending instruction message is sent by the source base station to the target base station after the source base station receives the EM confirmation feedback message sent by the terminal, and the EM confirmation feedback message is used for indicating that the first EM is correctly received by the terminal.

In the above solution, the EM confirmation feedback message received by the target base station is borne on a non-split bearer on the target base station side or a split bearer on the target base station side. The EM confirmation feedback message received by the source base station is borne on the non-split bearer on the source base station side or the split bearer on the source base station side.

For example, refer to FIG. 4(b), which is a second schematic diagram of data forwarding according to an embodiment of the present disclosure. The source base station directly forwards the downlink data packet to the target base station, and after the target base station receives the downlink data packet forwarded by the source base station, it caches the downlink data packet and does not send it to the terminal until the target base station receives the EM confirmation feedback message through ③ or ④, or the target base station does not send the downlink data packet to the terminal until the target base station receives the sending instruction message from the source base station. Here, after receiving the EM confirmation feedback message through ① or ②, the source base station sends the sending instruction message to the target base station. The EM confirmation feedback messages for ① and ④ are borne on the non-split bearer, and the EM confirmation feedback messages for ② and ③ are borne on the split bearer.

In the above solution, when the target base station sends the downlink data packet to the terminal, it uses the second key to encrypt the downlink data packet and/or uses the second ROHC profile to compress the downlink data packet, and sends the downlink data packet having the second data format to the terminal.

In the above solution, the downlink data packet forwarded by the source base station to the target base station includes: a downlink data packet that is not sent by the source base station to the terminal and/or a downlink data packet that is sent by the source base station to the terminal but is not correctly received by the terminal.

It should be noted that the downlink data packets in the above solution are borne on Signaling Radio Bearers (SRBs) or Data Radio Bearers (DRBs).

FIG. 3 is a second schematic flowchart of a method for distinguishing data formats according to an embodiment of the present disclosure. As shown in FIG. 3, the method for distinguishing data formats includes the following steps.

In step 301, a network receives a uplink data packet, and determines whether a data format of the uplink data packet is a first data format or a second data format, where the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station.

In the embodiments of the present disclosure, the network receives the uplink data packet sent by the terminal, and the terminal may be any device capable of communicating with the network, such as a mobile phone, a tablet computer, a notebook, a vehicle-mounted terminal, and the like.

In the embodiments of the present disclosure, the source base station refers to a source base station in the handover process, and the target base station refers to a target base station in the handover process. The source base station and the target base station may be of the same type or different types. For example, the source base station is an LTE base station (i.e., eNB), and the target base station is an NR base station (i.e., gNB). For another example, the source base station and the target base station are both LTE base stations (i.e., eNBs) or both NR base stations (i.e., gNBs).

In the embodiments of the present disclosure, the handover process is implemented based on the DC architecture. On this basis, during the handover process, the source base station and the target base station may communicate with the terminal simultaneously, where the source base station side has its own first key and/or first ROHC profile, the target base station side has its own second key and/or second ROHC profile, the first key and/or first ROHC profile of the source base station is used for the data packets transmitted between the terminal and the source base station, and the second key and/or the second ROHC profile of the target base station is used for the data packets transmitted between the terminal and the target base station.

In an embodiment of the present disclosure, after receiving the uplink data packet, the network needs to determine whether the data format of the uplink data packet is the first data format or the second data format, where the first data format indicates that the uplink data packet is encrypted with the first key of the source base station and/or compressed with the first ROHC profile of the source base station, and the second data format indicates that the uplink data packet is encrypted with the second key of the target base station and/or compressed with the second ROHC profile of the target base station. Further, if the uplink data packet is in the first data format, the network uses the first key to decrypt the uplink data packet and/or uses the first ROHC profile to decompress the uplink data packet, and if the uplink data packet is in the second data format, the network uses the second key to decrypt the uplink data packet and/or uses the second ROHC profile to decompress the uplink data packet.

For example, base station 1 is the source base station, and base station 2 is the target base station, where base station 1 uses a key, K1, and uses a ROHC profile, ROHC profile1, and base station 2 uses a key, K2, and uses a ROHC profile, ROHC profile2. The terminal needs to support both {K1, ROHC profile1} and {K2, ROHC profile2}, the data packets transmitted between the terminal and base station 1 are encrypted/decrypted with K1, and are compressed/decompressed with ROHC profile1, and the data packets transmitted between the terminal and base station 2 are encrypted/decrypted with K2, and are compressed/decompressed with ROHC profile2. It should be noted that a sending side of the data packets performs encryption and compression operations, and a receiving side of the data packets performs decryption and decompression operations.

In the embodiments of the present disclosure, the network may determine whether the data format of the uplink data packet is the first data format or the second data format in the following manners.

Manner 1: The network determines whether the data format of the uplink data packet is the first data format or the second data format through first indication information.

The following describes how to distinguish between the first data format and the second data format in combination with different implementations of the first indication information.

1) The first indication information is carried in a header of the uplink data packet, and the first indication information is carried in the header of the uplink data packet by the terminal.

In an embodiment, the first indication information includes at least first bit information, and a value of the first bit information indicates whether the data format of the uplink data packet is the first data format or the second data format.

For example, 1-bit information is carried in the header of each uplink data packet sent to the network by the terminal, when the value of the 1-bit information is 1, it represents that the uplink data packet has the first data format, that is, the uplink data packet is encrypted with the first key and/or compressed with the first ROHC profile, and when the value of the 1-bit information is 0, it represents that the uplink data packet has the second data format, that is, the uplink data packet is encrypted with the second key and/or compressed with the second ROHC profile.

2) The first indication information is carried in fourth RRC signaling which is sent by the terminal to the target base station after the terminal sends the last uplink data packet to the source base station.

For example, after the terminal sends the last uplink data packet to the source base station, it sends the first indication information to the target base station through the RRC signaling to indicate that the terminal has switched the first key to the second key, and/or switched the first ROHC profile to the second ROHC profile.

Further, the first indication information is also used for indicating an identity of the target base station. It should be noted that in the conditional handover scenario, the handover command (HO command) includes the information and handover conditions of multiple target base stations. When the terminal detects that a certain target base station meets the handover conditions, it switches to this target base station, and the first indication information may carry the identity of the target base station.

Manner 2: The network determines whether the data format of the uplink data packet is the first data format or the second data format through a RLC entity corresponding to the uplink data packet.

Here, the uplink data packet of the source base station is borne by the first RLC entity of the source base station, and the uplink data packet of the target base station is borne by the second RLC entity of the target base station, accordingly, if the uplink data packet received by the network is borne by the first RLC entity of the source base station, the network determines that the data format of the uplink data packet is the first data format, and if the uplink data packet received by the network is borne by the second RLC entity of the target base station, the network determines that the data format of the uplink data packet is the second data format.

For example, the terminal bears the uplink data packet with the first data format on the first RLC entity, and bears the uplink data packet with the second data format on the second RLC entity. The network side can determine whether the data format of the uplink data packet is the first data format or the second data format based on the RLC entity bearing the uplink data packet.

Manner 3: The network uses the first key and the second key to decrypt the uplink data packet, and/or uses the first ROHC profile and the second ROHC profile to compress the uplink data packet, and determines whether the data format of the uplink data packet is the first data format or the second data format based on the decryption result and/or the decompression result.

The network using the first key and the second key to decrypt the uplink data packet includes that: the network first uses the first key to decrypt the uplink data packet, and then uses the second key to decrypt the uplink data packet; the network first uses the second key to decrypt the uplink data packet, and then uses the first key to decrypt the uplink data packet; or the network first uses the key with which the last uplink data packet has been successfully decrypted to decrypt the uplink data packet, and then uses the key with which the last uplink data packet is not successfully decrypted to decrypt the uplink data packet.

Manner 4: The network determines whether the data format of the uplink data packet is the first data format or the second data format through a second EM.

The second EM indicates a last uplink data packet that is encrypted with the first key and/or compressed with the first ROHC profile. Further, the second EM carries a serial number of the uplink data packet.

In the embodiments of the present disclosure, after confirming that the second EM is correctly received by the network, the terminal uses the second key to encrypt the uplink data packet to be sent and/or uses the second ROHC profile to compress the uplink data packet to be sent. Further, after confirming that the second EM and all uplink data packets before the second EM are correctly received by the network, the terminal uses the second key to encrypt the uplink data packet to be sent and/or uses the second ROHC profile to compress the uplink data packet to be sent.

In the above solution, the terminal confirming that the second EM is correctly received by the network includes that the terminal receives a EM confirmation feedback message sent by the target base station, or that the terminal receives the EM confirmation feedback message sent by the source base station, where the EM confirmation feedback message is used for indicating that the second EM is correctly received by the network.

In the above solution, after receiving the second EM, the source base station sends the EM confirmation feedback message to the terminal, and notifies the target base station that the network side has received the second EM. Alternatively, after receiving the second EM, the source base station notifies the target base station that the network side has received the second EM, and the target base station sends the EM confirmation feedback message to the terminal.

For Manner 4, the terminal sends the second EM to the network side for the network side to determine whether the data format of the received uplink data packet is the first data format or the second data format. The second EM represents the last uplink data packet encrypted with the first key and/or compressed with the first ROHC profile. In this way, before receiving the second EM, the network side uses the first key and/or the first ROHC profile, and after receiving the second EM, the network side uses the second key and/or the second ROHC profile.

It should be noted that the uplink data packet in the above solution is borne on the SRB or DRB.

FIG. 5 is a third schematic flowchart of a method for distinguishing data formats according to an embodiment of the present disclosure. As shown in FIG. 5, the method for distinguishing data formats includes the following steps.

In step 501, a terminal sends a uplink data packet, the uplink data packet having a first data format or a second data format, where the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station.

In the embodiments of the present disclosure, the terminal may be any device capable of communicating with the network, such as a mobile phone, a tablet, a notebook, a vehicle-mounted terminal, and the like.

In the embodiments of the present disclosure, the source base station refers to a source base station in the handover process, and the target base station refers to a target base station in the handover process. The source base station and the target base station may be of the same type or different types. For example, the source base station is an LTE base station (i.e., eNB), and the target base station is an NR base station (i.e., gNB). For another example, the source base station and the target base station are both LTE base stations (i.e., eNBs) or both NR base stations (i.e., gNB s).

In the embodiments of the present disclosure, the handover process is implemented based on the DC architecture. On this basis, during the handover process, the source base station and the target base station may communicate with the terminal simultaneously, where the source base station side has its own first key and/or first ROHC profile, the target base station side has its own second key and/or second ROHC profile, the first key and/or first ROHC profile of the source base station is used for the data packets transmitted between the terminal and the source base station, and the second key and/or the second ROHC profile of the target base station is used for the data packets transmitted between the terminal and the target base station.

In step 502, the terminal indicates to a network whether the data format of the uplink data packet is the first data format or the second data format.

In the embodiments of the present disclosure, the terminal may indicate to the network whether the data format of the uplink data packet is the first data format or the second data format in the following manners.

Manner 1: The terminal sends first indication information to the network, where the first indication information is used by the network to determine whether the data format of the uplink data packet is the first data format or the second data format.

The following describes how to distinguish between the first data format and the second data format in combination with different implementations of the first indication information.

1) The terminal carries the first indication information in the header of each uplink data packet sent to the network.

In an embodiment, the first indication information includes at least first bit information, and a value of the first bit information indicates whether the data format of the uplink data packet is the first data format or the second data format.

For example, 1-bit information is carried in the header of each uplink data packet sent to the network by the terminal, when the value of the 1-bit information is 1, it represents that the uplink data packet has the first data format, that is, the uplink data packet is encrypted with the first key and/or compressed with the first ROHC profile, and when the value of the 1-bit information is 0, it represents that the uplink data packet has the second data format, that is, the uplink data packet is encrypted with the second key and/or compressed with the second ROHC profile.

2) The terminal sends fourth RRC signaling to the network, and the fourth RRC signaling carries the first indication information, where the fourth RRC signaling is sent to the target base station by the terminal after a last one of the uplink data packets is sent to the source base station by the terminal.

For example, after the terminal sends the last uplink data packet to the source base station, it sends the first indication information to the target base station through the RRC signaling to indicate that the terminal has switched the first key to the second key, and/or switched the first ROHC profile to the second ROHC profile.

Manner 2: the terminal bears the uplink data packet with the first data format on the first RLC entity, and bears the uplink data packet with the second data format on the second RLC entity. The network side can determine whether the data format of the uplink data packet is the first data format or the second data format based on the RLC entity bearing the uplink data packet.

Manner 3: The terminal sends a second EM to the network, where the second EM is used by the network to determine whether the data format of the uplink data packet is the first data format or the second data format.

The second EM indicates the last uplink data packet that is encrypted with the first key and/or compressed with the first ROHC profile. Further, the second EM carries the serial number of the uplink data packet.

In this way, before receiving the second EM, the network side uses the first key and/or the first ROHC profile, and after receiving the second EM, the network side uses the second key and/or the second ROHC profile.

In the embodiments of the present disclosure, after confirming that the second EM is correctly received by the network, the terminal uses the second key to encrypt the uplink data packet to be sent and/or uses the second ROHC profile to compress the uplink data packet to be sent. Further, after confirming that the second EM and all uplink data packets before the second EM are correctly received by the network, the terminal uses the second key to encrypt the uplink data packet to be sent and/or uses the second ROHC profile to compress the uplink data packet to be sent.

In the above solution, the terminal confirming that the second EM is correctly received by the network includes that the terminal receives the EM confirmation feedback message sent by the target base station, or that the terminal receives the EM confirmation feedback message sent by the source base station, where the EM confirmation feedback message is used for indicating that the second EM is correctly received by the network.

In the above solution, after receiving the second EM, the source base station sends the EM confirmation feedback message to the terminal, and notifies the target base station that the network side has received the second EM. Alternatively, after receiving the second EM, the source base station notifies the target base station that the network side has received the second EM, and the target base station sends the EM confirmation feedback message to the terminal.

FIG. 6 is a first schematic structural diagram of a device for distinguishing data formats according to an embodiment of the present disclosure. As shown in FIG. 6, the device includes: a receiving unit 601 configured to receive a downlink data packet; and a determining unit 602 configured to determine whether a data format of the downlink data packet is a first data format or a second data format, where the first data format indicates that the downlink data packet is encrypted with a first key of a source base station and/or compressed with a first ROHC profile of the source base station, and the second data format indicates that the downlink data packet is encrypted with a second key of a target base station and/or compressed with a second ROHC profile of the target base station.

In an embodiment, the device further includes: a parsing unit 603 configured to decrypt the downlink data packet with the first key and/or decompress the downlink data packet with the first ROHC profile when the downlink data packet is in the first data format, and to decrypt the downlink data packet with the second key and/or decompress the downlink data packet with the second ROHC profile when the downlink data packet is in the second data format.

In an embodiment, the determining unit 602 is configured to determine whether the data format of the downlink data packet is the first data format or the second data format through first indication information.

In an embodiment, the first indication information is carried in a handover command, and the handover command is sent by the source base station to the terminal.

In an embodiment, the first indication information includes at least a first serial number of the PDCP layer.

In an embodiment, the determining unit 602 determines that the data format of the downlink data packet is the first data format when a serial number of the downlink data packet received by the terminal is less than the first serial number; and the determining unit 602 determines that the data format of the downlink data packet is the second data format when the serial number of the downlink data packet received by the terminal is greater than the first serial number.

In an embodiment, the downlink data packets before the first serial number are encrypted by the source base station with the first key and/or compressed with the first ROHC profile, and then are sent to the terminal; or the downlink data packets before the first serial number are encrypted by the source base station with the first key and/or compressed with the first ROHC profile, forwarded to the target base station by the target base station, and sent to the terminal by the target base station.

In an embodiment, the downlink data packets after the first serial number are encrypted by the target base station with the second key and/or compressed with the second ROHC profile, and then sent to the terminal; or the downlink data packets after the first serial number are encrypted by the target base station with the second key and/or compressed with the second ROHC profile, forwarded to the source base station by the target base station, and sent to the terminal by the source base station.

In an embodiment, the first indication information is carried in a header of the downlink data packet, and the first indication information is carried in the header of the downlink data packet by the network side.

In an embodiment, the first indication information includes at least first bit information, and a value of the first bit information indicates whether the data format of the downlink data packet is the first data format or the second data format.

In an embodiment, the determining unit 602 is further configured to determine an activated state or deactivated state of the first indication information based on a first condition.

In an embodiment, the device further includes: an activation unit (not shown) configured to activate the first indication information when first RRC signaling is received, where the first RRC signaling is used for instructing to activate the first indication information, or configured to activate the first indication information when a handover command is received.

In an embodiment, the device further includes: a deactivation unit (not shown) configured to deactivate the first indication information when second RRC signaling is received, where the second RRC signaling is used for instructing to deactivate the first indication information, or configured to deactivate the first indication information when the handover is completed.

In an embodiment, the first indication information is carried in third RRC signaling, and the third RRC signaling is sent by the source base station to the terminal after the source base station sends the last downlink data packet to the terminal.

In an embodiment, the determining unit 602 is configured to determine whether the data format of the downlink data packet is the first data format or the second data format through a RLC entity corresponding to the downlink data packet.

In an embodiment, the downlink data packet of the source base station is borne on a first RLC entity of the terminal, and the downlink data packet of the target base station is borne on a second RLC entity of the terminal; the determining unit 602 determines that the data format of the downlink data packet is the first data format when the downlink data packet received by the receiving unit 601 is borne on the first RLC entity of the terminal; and the determining unit 602 determines that the data format of the downlink data packet is the second data format when the downlink data packet received by the receiving unit 601 is borne on the second RLC entity of the terminal.

In an embodiment, the device further includes: a parsing unit 603 configured to decrypt the downlink data packet with the first key and the second key, and/or decompress the downlink data packet with the first ROHC profile and the second ROHC profile, the determining unit 602 is configured to determine whether the data format of the downlink data packet is the first data format or the second data format based on the decryption result and/or the decompression result.

In an embodiment, the parsing unit 603 is configured to: decrypt the downlink data packet first with the first key, and then decrypt the downlink data packet with the second key; decrypt the downlink data packet first with the second key, and then decrypt the downlink data packet with the first key; or decrypt the downlink data packet first with the key with which the last downlink data packet has been successfully decrypted, and then decrypt the downlink data packet with the key with which the last downlink data packet is not successfully decrypted.

In an embodiment, the determining unit 602 is configured to determine whether the data format of the downlink data packet is the first data format or the second data format through a first EM.

In an embodiment, the first EM represents the last downlink data packet that is encrypted with the first key and/or compressed with the first ROHC profile.

In an embodiment, the first EM carries a serial number of the downlink data packet.

In an embodiment, when receiving second indication information, the source base station forwards the downlink data packet to the target base station, and when receiving the downlink data packet forwarded by the source base station, the target base station sends the downlink data packet to the terminal.

In an embodiment, the source base station forwarding the downlink data packet to the target base station when receiving the second indication information includes that: the source base station forwards the downlink data packet to the target base station after receiving an EM confirmation feedback message sent by the terminal; or the source base station forwards the downlink data packet to the target base station after receiving a forwarding instruction message sent by the target base station, where the forwarding instruction message is sent to the source base station by the target base station after the target base station receives the EM confirmation feedback message sent by the terminal, where the EM confirmation feedback message is used for indicating that the first EM is correctly received by the terminal.

In an embodiment, the EM confirmation feedback message received by the source base station is borne on a non-split bearer on the source base station side or on a split bearer on the source base station side.

In an embodiment, the EM confirmation feedback message received by the target base station is borne on a non-split bearer on the target base station side or on a split bearer on the target base station side.

In an embodiment, the source base station forwards the downlink data packet to the target base station, and after the target base station receives the downlink data packet forwarded by the source base station, it caches the downlink data packet and does not send the downlink data packet to the terminal until the second indication information is received.

In an embodiment, sending the downlink data packet to the terminal after the second indication information is received includes that: the target base station sends the downlink data packet to the terminal after receiving the EM confirmation feedback message sent by the terminal; or the target base station sends the downlink data packet to the terminal after receiving a sending instruction message sent by the source base station, the sending instruction message being sent to the target base station by the source base station after the source base station receives the EM confirmation feedback message sent by the terminal, where the EM confirmation feedback message is used for indicating that the first EM is correctly received by the terminal.

In an embodiment, the EM confirmation feedback message received by the target base station is borne on a non-split bearer on the target base station side or on a split bearer on the target base station side.

In an embodiment, the EM confirmation feedback message received by the source base station is borne on a non-split bearer on the source base station side or on a split bearer on the source base station side.

In an embodiment, sending the downlink data packet by the target base station to the terminal includes encrypting the downlink data packet with the second key and/or compressing the downlink data packet with the second ROHC profile and sending the downlink data packet having the second data format to the terminal by the target base station.

In an embodiment, the downlink data packet forwarded by the source base station to the target base station includes: a downlink data packet that is not sent by the source base station to the terminal and/or a downlink data packet that is sent by the source base station to the terminal but not correctly received by the terminal.

In an embodiment, the downlink data packet is borne on a SRB or a Data Radio Bearer (DRB).

Those skilled in the art should understand that the relevant description of the foregoing device for distinguishing data formats in the embodiments of the present disclosure can be understood with reference to the relevant description of the method for distinguishing data formats in the embodiments of the present disclosure.

FIG. 7 is a second schematic structural diagram of a device for distinguishing data formats according to an embodiment of the present disclosure. As shown in FIG. 7, the device includes a receiving unit 701 configured to receive a uplink data packet; and a determining unit 702 configured to determine whether a data format of the uplink data packet is a first data format or a second data format, where the first data format indicates that the uplink data packet is encrypted with a first key of a source base station and/or compressed with a first ROHC profile of the source base station, and the second data format indicates that the uplink data packet is encrypted with a second key of a target base station and/or compressed with a second ROHC profile of the target base station.

In an embodiment, the device further includes: a parsing unit 703 configured to decrypt the uplink data packet with the first key and/or decompress the uplink data packet with the first ROHC profile when the uplink data packet is in the first data format, and to decrypt the uplink data packet with the second key and/or decompress the uplink data packet with the second ROHC profile when the uplink data packet is in the second data format.

In an embodiment, the determining unit 702 is configured to determine whether the data format of the uplink data packet is the first data format or the second data format through first indication information.

In an embodiment, the first indication information is carried in a header of the uplink data packet, and the first indication information is carried in the header of the uplink data packet by the terminal.

In an embodiment, the first indication information includes at least first bit information, and a value of the first bit information indicates whether the data format of the uplink data packet is the first data format or the second data format.

In an embodiment, the first indication information is carried in fourth RRC signaling which is sent by the terminal to the target base station after the terminal sends the last uplink data packet to the source base station.

In an embodiment, the first indication information is also used for indicating an identity of the target base station.

In an embodiment, the determining unit 702 is configured to determine whether the data format of the uplink data packet is the first data format or the second data format through a RLC entity corresponding to the uplink data packet.

In an embodiment, the uplink data packet of the source base station is borne on a first RLC entity of the source base station, and the uplink data packet of the target base station is borne on a second RLC entity of the target base station; the determining unit 702 determines that the data format of the uplink data packet is the first data format when the uplink data packet received by the receiving unit 701 is borne on the first RLC entity of the source base station; and the determining unit 702 determines that the data format of the uplink data packet is the second data format when the uplink data packet received by the receiving unit 701 is borne on the second RLC entity of the target base station.

In an embodiment, the device further includes: a parsing unit 703 configured to decrypt the uplink data packet with the first key and the second key, and/or decompress the uplink data packet with the first ROHC profile and the second ROHC profile, the determining unit 702 is configured to determine whether the data format of the uplink data packet is the first data format or the second data format based on the decryption result and/or the decompression result.

In an embodiment, the parsing unit 703 is configured to: decrypt the uplink data packet first with the first key, and then decrypt the uplink data packet with the second key; decrypt the uplink data packet first with the second key, and then decrypt the uplink data packet with the first key; or decrypt the uplink data packet first with the key with which the last uplink data packet has been successfully decrypted, and then decrypt the uplink data packet with the key with which the last uplink data packet is not successfully decrypted.

In an embodiment, the determining unit 702 is configured to determine whether the data format of the uplink data packet is the first data format or the second data format through a second EM.

In an embodiment, the second EM represents the last uplink data packet that is encrypted with the first key and/or compressed with the first ROHC profile.

In an embodiment, the second EM carries a serial number of the uplink data packet.

In an embodiment, after confirming that the second EM is correctly received by the network, the terminal uses the second key to encrypt the uplink data packet to be sent and/or uses the second ROHC profile to compress the uplink data packet to be sent.

In an embodiment, after confirming that the second EM and all uplink data packets before the second EM are correctly received by the network, and the terminal uses the second key to encrypt the uplink data packet to be sent and/or uses the second ROHC profile to compress the uplink data packet to be sent.

In an embodiment, the terminal confirming that the second EM is correctly received by the network includes that: the terminal receives a EM confirmation feedback message sent by the target base station; or the terminal receives the EM confirmation feedback message sent by the source base station, where the EM confirmation feedback message is used for indicating that the second EM is correctly received by the network.

In an embodiment, after receiving the second EM, the source base station sends the EM confirmation feedback message to the terminal, and notifies the target base station that the network side has received the second EM; or after receiving the second EM, the source base station notifies the target base station that the network side has received the second EM, and the target base station sends the EM confirmation feedback message to the terminal.

In an embodiment, the uplink data packet is borne on a SRB or DRB.

Those skilled in the art should understand that the relevant description of the foregoing device for distinguishing data formats in the embodiments of the present disclosure can be understood with reference to the relevant description of the method for distinguishing data formats in the embodiments of the present disclosure.

FIG. 8 is a schematic structural diagram of a communication device 600 according to an embodiment of the present disclosure. The communication device can be a terminal or a network device, such as a base station. The communication device 600 shown in FIG. 8 includes a processor 610 which can invoke and execute a computer program from a memory to carry out the methods in the embodiments of the present disclosure.

Optionally, as shown in FIG. 8, the communication device 600 can further include a memory 620. The processor 610 can invoke and run the computer program from the memory 620 to carry out the methods in the embodiments of the present disclosure.

The memory 620 can be a separate device independent of the processor 610, or can be integrated in the processor 610.

Optionally, as shown in FIG. 8, the communication device 600 can further include a transceiver 630, and the processor 610 can control the transceiver 630 to communicate with other devices, and specifically, to transmit information or data to other devices, or receive information or data transmitted from other devices.

The transceiver 630 can include a transmitter and a receiver. The transceiver 630 can further include one or more antennas.

Optionally, the communication device 600 can specifically be a network device in the embodiments of the present disclosure, and the communication device 600 can carry out the corresponding processes which are implemented by the network device in the methods of the embodiments of the present disclosure, which will not be repeated here for the sake of brevity.

Optionally, the communication device 600 can specifically be a mobile terminal/terminal in the embodiments of the present disclosure, and the communication device 600 can implement the corresponding processes which are implemented by the mobile terminal/terminal in the methods according to the embodiments of the present disclosure, which will not be repeated here for the sake of brevity.

Figure 9:
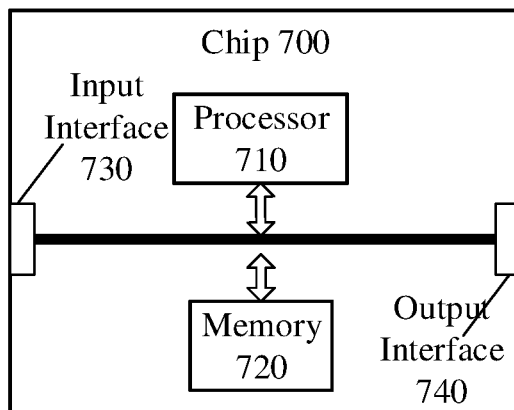
FIG. 9 is a schematic structural diagram of a chip according to an embodiment of the present disclosure.

FIG. 9 is a schematic structural diagram of a chip according to an embodiment of the present disclosure. The chip 700 shown in FIG. 9 includes a processor 710 which can invoke and run a computer program from a memory to implement the methods in the embodiments of the present disclosure.

Optionally, as shown in FIG. 9, the chip 700 can further include a memory 720. The processor 710 can invoke and run the computer program from the memory 720 to implement the methods in the embodiments of the present disclosure.

The memory 720 can be a separate device independent of the processor 710, or can be integrated in the processor 710.

Optionally, the chip 700 can further include an input interface 730. The processor 710 can control the input interface 730 to communicate with other devices or chips, and particularly to obtain information or data transmitted by other devices or chips.

Optionally, the chip 700 can further include an output interface 740. The processor 710 can control the output interface 740 to communicate with other devices or chips, and particularly to output information or data to other devices or chips.

Optionally, the chip can be applied to the network device in the embodiments of the present disclosure, and the chip can carry out the corresponding processes which are implemented by the network device in the methods of the embodiments of the present disclosure, which will not be repeated here for the sake of brevity.

Optionally, the chip can be applied to the mobile terminal/terminal in the embodiments of the present disclosure, and the chip can implement the corresponding processes which are implemented by the mobile terminal/terminal in the methods of the embodiments of the present disclosure, which will not be repeated here for the sake of brevity.

It should be understood that the chip mentioned in the embodiments of the present disclosure can also be referred to as a system-level chip, a system chip, a chip system, or a system-on-chip.

Figure 10:
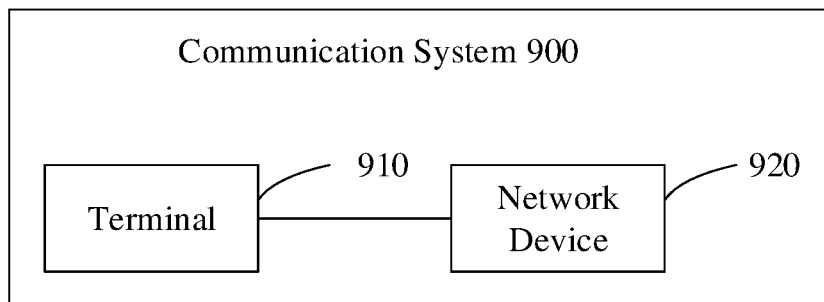
FIG. 10 is a schematic block diagram of a communication system according to an embodiment of the present disclosure.

FIG. 10 is a schematic block diagram of a communication system 900 according to an embodiment of the present disclosure. As shown in FIG. 10, the communication system 900 includes a terminal 910 and a network device 920.

The terminal 910 can be configured to carry out the corresponding functions implemented by the terminal in the above methods, and the network device 920 can be configured to carry out the corresponding functions implemented by the network device in the above methods, which will not be repeated here for the sake of brevity.

It should be understood that the processor of the embodiments of the present disclosure can be an integrated circuit chip with signal processing capability. In the implementations, the steps of the foregoing method embodiments can be performed by an integrated logic circuit of hardware in the processor or by instructions in a form of software. The foregoing processor can be a general-purpose processor, a Digital Signal Processor (DSP), an Application Specific Integrated Circuit (ASIC), a Field Programmable Gate Array (FPGA), another programmable logic device, discrete gate or transistor logic device, or a discrete hardware component, which can implement the methods, steps, and logical blocks disclosed in the embodiments of the present disclosure. The general-purpose processor can be a microprocessor, any conventional processor or the like. The steps of the methods disclosed in connection with the embodiments of the present disclosure can be directly embodied in and performed by a hardware decoding processor, or can be implemented by a combination of hardware and software modules in the decoding processor. The software modules can be located in a mature storage medium in the art such as a random access memory, a flash memory, a read-only memory, a programmable read-only memory, an electrically erasable programmable memory or a register. The storage medium is located in the memory, and the processor reads information in the memory and implements the steps of the above methods in combination with the hardware thereof.

It can be understood that the memory in the embodiments of the present disclosure may be a volatile memory or a non-volatile memory, or may include both the volatile and non-volatile memories. In an embodiment, the non-volatile memory can be a Read-Only Memory (ROM), a Programmable ROM (PROM), an erasable PROM (EPROM), an electrically EPROM (EEPROM) or a flash memory. The volatile memory may be a Random Access Memory (RAM), which is used as an external cache. By way of exemplary but not restrictive description, many forms of RAMS are available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-link DRAM (SLDRAM)) and a Direct Rambus RAM (DR RAM). It should be noted that the memories of the systems and methods described herein are intended to include, but are not limited to, these and any other suitable types of memories.

It should be understood that the foregoing description of the memory is exemplary rather than limiting. For example, the memory in the embodiments of the present disclosure can also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch-Link DRAM (SLDRAM), a Direct Rambus RAM (DR RAM), among others. That is to say, the memory in the embodiments of the present disclosure is intended to include but is not limited to those and any other suitable types of memories.

The embodiments of the present disclosure also provide a computer-readable storage medium for storing a computer program.

Optionally, the computer-readable storage medium can be applied to the network device in the embodiments of the present disclosure, and the computer program causes a computer to perform the corresponding processes which are implemented by the network device in the methods of the embodiments of the present disclosure, which will not be repeated here for the sake of brevity.

Optionally, the computer-readable storage medium can be applied to the mobile terminal/terminal in the embodiments of the present disclosure, and the computer program causes the computer to perform the corresponding processes which are implemented by the mobile terminal/terminal in the methods of the embodiments of the present disclosure, which will not be repeated here for the sake of brevity.

The embodiments of the present disclosure also provide a computer program product including computer program instructions.

Optionally, the computer program product can be applied to the network device in the embodiments of the present disclosure, and the computer program instructions cause a computer to perform the corresponding processes implemented by the network device in the methods of the embodiments of the present disclosure, which will not be repeated here for the sake of brevity.

Optionally, the computer program product can be applied to the mobile terminal/terminal in the embodiments of the present disclosure, and the computer program instructions cause a computer to perform the corresponding processes implemented by the mobile terminal/terminal in the methods of the embodiments of the present disclosure, which will not be repeated here for the sake of brevity.

The embodiments of the present disclosure also provide a computer program.

Optionally, the computer program can be applied to the network device in the embodiments of the present disclosure, and when running on a computer, the computer program causes the computer to perform the corresponding process implemented by the network device in the methods of the embodiments of the present disclosure, which will not be repeated here for the sake of brevity.

Optionally, the computer program can be applied to the mobile terminal/terminal in the embodiments of the present disclosure, and when running on a computer, causes the computer to perform the corresponding process implemented by the mobile terminal/terminal in the methods of the embodiments of the present disclosure, which will not be repeated here for the sake brevity.

Those of ordinary skill in the art can recognize that the exemplary units and algorithm steps described in connection with the embodiments disclosed herein can be implemented in electronic hardware or a combination of computer software and the electronic hardware. Whether these functions are implemented in hardware or software depends on the specific applications of the technical solutions and design constraints. Various methods can be used by professional technicians to implement the described functions for each specific application, and such implementations should not be considered as going beyond the scope of the present disclosure.

Those skilled in the art can clearly understand that for the convenience and conciseness of the description, for the specific operating process of the systems, devices and units described above, reference can be made to corresponding process in the foregoing method embodiments, which will not be repeated here.

It should be understood that the systems, devices, and methods disclosed in several embodiments of the present disclosure can be implemented in other manners. For example, the device embodiments described above are merely illustrative. For example, the division of the units is only a logical function division, and in actual implementations, there can be other division manners. For example, a plurality of units or components can be combined or integrated into another system, or some features can be ignored or not implemented. In addition, the coupling or direct coupling or communication connection shown or discussed herein can also be indirect coupling or communication connection through some interfaces, devices or units, and can be in electrical, mechanical or other forms.

The units described as separate components may be or may not be physically separated, and the components shown as units may be or may not be physical units, that is, they may be located in one place or may be distributed on multiple network units. Some or all of the units can be selected to achieve the objectives of the solutions of the embodiments according to actual requirements.

In addition, the functional units in the embodiments of the present disclosure can be integrated into one processing unit, or each unit can individually exist physically, or two or more of the units can be integrated into one unit.

If implemented in the form of software functional units and sold or used as an independent product, the functions can be stored in a computer-readable storage medium. Based on such understanding, the technical solution of the present disclosure essentially, a part thereof that contributes to the prior art, or a part of the technical solution can be embodied in the form of a software product, and the computer software product is stored in a storage medium and includes instructions which enable a computer device (which may be a personal computer, a server, a network device or the like) to perform all or part of the steps of the methods described in the embodiments of the present disclosure. The foregoing storage medium includes various medium such as a USB drive, a removable hard disk, a ROM, a RAM, a magnetic disk or an optical disc that can store program codes.

Those described above are only specific implementations of the present disclosure, and the protection scope of the present disclosure is not limited thereto. Any alteration or replacement readily devised by a person skilled in the art within the technical scope disclosed in the present disclosure shall fall within the scope of the present disclosure. Therefore, the protection scope of the present disclosure shall be subject to the protection scope of the claims.

What is claimed is:

1. A method for distinguishing data formats, comprising:
receiving, by a terminal, a downlink data packet; and
determining, by the terminal, whether a data format of the downlink data packet is a first data format or a second data format,
wherein the first data format indicates that the downlink data packet is at least one of encrypted with a first key of a source base station or compressed with a first ROHC profile of the source base station, and
the second data format indicates that the downlink data packet is at least one of encrypted with a second key of a target base station or compressed with a second ROHC profile of the target base station,
wherein the determining, by the terminal, whether the data format of the downlink data packet is the first data format or the second data format comprises:
determining, by the terminal through a Radio Link Control (RLC) entity corresponding to the downlink data packet, whether the data format of the downlink data packet is the first data format or the second data format,
wherein the downlink data packet of the source base station is borne on a first RLC entity of the terminal, and the downlink data packet of the target base station is borne on a second RLC entity of the terminal,
the terminal determines that the data format of the downlink data packet is the first data format when the downlink data packet received by the terminal is borne on the first RLC entity of the terminal, and
the terminal determines that the data format of the downlink data packet is the second data format when the downlink data packet received by the terminal is borne on the second RLC entity of the terminal.

2. The method according to claim 1, further comprising:
at least one of decrypting the downlink data packet with the first key or decompressing the downlink data packet with the first ROHC profile, by the terminal when the downlink data packet is in the first data format; and
at least one of decrypting the downlink data packet with the second key or decompressing the downlink data packet with the second ROHC profile, by the terminal when the downlink data packet is in the second data format.

3. A method for distinguishing data formats, comprising:
receiving an uplink data packet by a network; and
determining by the network whether a data format of the uplink data packet is a first data format or a second data format,
wherein the first data format indicates that the uplink data packet is at least one of encrypted with a first key of a source base station or compressed with a first ROHC profile of the source base station, and the second data format indicates that the uplink data packet is at least one of encrypted with a second key of a target base station or compressed with a second ROHC profile of the target base station,
wherein the determining, by the network, whether the data format of the uplink data packet is the first data format or the second data format comprises:
determining, by the network through a RLC entity corresponding to the uplink data packet, whether the data format of the uplink data packet is the first data format or the second data format,
wherein the uplink data packet of the source base station is borne on a first RLC entity of the source base station, and the uplink data packet of the target base station is borne on a second RLC entity of the target base station;
the network determines that the data format of the uplink data packet is the first data format when the uplink data packet received by the network is borne on the first RLC entity of the source base station, and the network determines that the data format of the uplink data packet is the second data format when the uplink data packet received by the network is borne on the second RLC entity of the target base station.

4. A terminal device, comprising:
a transceiver configured to receive a downlink data packet; and
a processor configured to determine whether a data format of the downlink data packet is a first data format or a second data format, wherein the first data format indicates that the downlink data packet is at least one of encrypted with a first key of a source base station or compressed with a first ROHC profile of the source base station, and the second data format indicates that the downlink data packet is at least one of encrypted with a second key of a target base station or compressed with a second ROHC profile of the target base station,
wherein the processor is configured to determine, through a RLC entity corresponding to the downlink data packet, whether the data format of the downlink data packet is the first data format or the second data format,
wherein the downlink data packet of the source base station is borne on a first RLC entity of the terminal, and the downlink data packet of the target base station is borne on a second RLC entity of the terminal;
the processor is configured to determine that the data format of the downlink data packet is the first data format when the downlink data packet received by the transceiver is borne on the first RLC entity of the terminal; and
the processor is configured to determine that the data format of the downlink data packet is the second data format when the downlink data packet received by the transceiver is borne on the second RLC entity of the terminal.

5. The terminal device according to claim 4, wherein the processor is configured to at least one of decrypt the downlink data packet with the first key and the second key, or decompress the downlink data packet with the first ROHC profile and the second ROHC profile,
wherein the processor is configured to determine whether the data format of the downlink data packet is the first data format or the second data format based on at least a decryption result or a decompression result, or
wherein the processor is configured to:
decrypt the downlink data packet first with the first key, and then decrypt the downlink data packet with the second key;
decrypt the downlink data packet first with the second key, and then decrypt the downlink data packet with the first key; or
decrypt the downlink data packet first with the key with which a last downlink data packet has been successfully decrypted, and then decrypt the downlink data packet with the key with which the last downlink data packet is not successfully decrypted.

6. The terminal device according to claim 4, wherein the downlink data packet is borne on a Signaling Radio Bearer (SRB) or a Data Radio Bearer (DRB).

* * * * *